United States Patent
Mosca et al.

(10) Patent No.: US 12,332,348 B2
(45) Date of Patent: Jun. 17, 2025

(54) DEPOINTABLE PARAMETRIC ECHOSOUNDER, AND METHOD FOR CHARACTERIZING A PORTION OF THE SUB-BOTTOM OF A SUBAQUATIC ENVIRONMENT

(71) Applicant: IXBLUE, Saint-Germain-en-Laye (FR)

(72) Inventors: Frédéric Mosca, Saint-Germain-en-Laye (FR); Guillaume Matte, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 99 days.

(21) Appl. No.: 17/793,352

(22) PCT Filed: Jan. 15, 2021

(86) PCT No.: PCT/EP2021/050850
§ 371 (c)(1),
(2) Date: Jul. 15, 2022

(87) PCT Pub. No.: WO2021/144444
PCT Pub. Date: Jul. 22, 2021

(65) Prior Publication Data
US 2023/0036543 A1  Feb. 2, 2023

(30) Foreign Application Priority Data
Jan. 17, 2020  (FR) ........................ 2000464

(51) Int. Cl.
*G01S 15/89*  (2006.01)
*G01S 15/10*  (2006.01)

(52) U.S. Cl.
CPC ............ *G01S 15/104* (2013.01); *G01S 15/89* (2013.01)

(58) Field of Classification Search
CPC ....... G01S 15/89; G01S 15/104; G01S 7/6245
See application file for complete search history.

(56) References Cited

U.S. PATENT DOCUMENTS 3,824,531 A    7/1974  Walsh
8,964,507 B2 *  2/2015  Bachelor .............. G10K 11/343
                                              367/103
(Continued)

FOREIGN PATENT DOCUMENTS

EP     0 070 494        1/1983
FR     0070494 A1 *     1/1983  ......... G01S 15/8902
(Continued)

OTHER PUBLICATIONS

Karaman, Minimally Redundant 2-D Array Designs for 3-D Medical Ultrasound Imaging (Year: 2009).*
(Continued)

*Primary Examiner* — Daniel L Murphy
*Assistant Examiner* — Amie M N'dure
(74) *Attorney, Agent, or Firm* — NIXON & VANDERHYE

(57) ABSTRACT

Disclosed is an echosounder configured to: a) drive the transducers of its emitting antenna to emit first and second acoustic waves having first and second frequencies, these waves being superposed over one another along an axis of superposition that is directed toward a point of the bottom of the subaquatic environment, and b) acquire an echo signal, the frequency of which is equal to the difference between the first and the second frequencies, the echosounder being configured to perform steps a) and b) a plurality of times while varying the orientation of the axis of superposition, and to determine, on the basis of the acquired echo signals, an image representative of the content of the sub-bottom of the subaquatic environment beneath each of the points. Also (Continued)

disclosed is an associated method for characterizing a portion of the sub-bottom of a subaquatic environment.

18 Claims, 6 Drawing Sheets

(56) References Cited

U.S. PATENT DOCUMENTS

| | | | | |
|---|---|---|---|---|
| 10,605,914 | B2* | 3/2020 | Steenstrup | G10K 11/008 |
| 2003/0216645 | A1* | 11/2003 | Yao | G01S 15/8993 |
| | | | | 600/437 |
| 2005/0007882 | A1* | 1/2005 | Bachelor | G10K 11/343 |
| | | | | 367/103 |
| 2008/0130413 | A1* | 6/2008 | Bachelor | G10K 11/343 |
| | | | | 367/103 |
| 2010/0074057 | A1* | 3/2010 | Bachelor | G01S 15/89 |
| | | | | 367/103 |
| 2013/0208568 | A1* | 8/2013 | Coleman | G01S 7/521 |
| | | | | 367/88 |
| 2015/0253425 | A1* | 9/2015 | Coleman | G01S 7/52 |
| | | | | 367/87 |
| 2017/0315234 | A1* | 11/2017 | Steenstrup | G01S 7/282 |
| 2017/0315236 | A1* | 11/2017 | Steenstrup | G01S 15/325 |
| 2017/0315237 | A1* | 11/2017 | Steenstrup | G01S 15/586 |
| 2017/0350978 | A1 | 12/2017 | Williamson et al. | |
| 2017/0363724 | A1 | 12/2017 | Reid | |
| 2022/0026570 | A1* | 1/2022 | Cunningham | G01S 7/539 |

FOREIGN PATENT DOCUMENTS

| | | |
|---|---|---|
| JP | H05223923 A | 9/1993 |
| JP | 2005051687 A | 2/2005 |
| JP | 2006105647 A | 4/2006 |

OTHER PUBLICATIONS

Lunn, Development of EMAT and piezoelectric transducers for high temperature ultrasonic thickness measurement (Year: 2018).*
Marchal et al., "Feasibility of B-Scan Imaging in Sediment by Means of Parametric Transmission Technique", Acta Acustica United With Acustica, 2004, vol. 90, pp. 62-69.
Nguyen, "Seafloor classification with a multi-swath multi-beam echo sounder", Signal and Image processing, Ecole nationale supérieure Mines-Télécom Atlantique, 2017, NNT: 2017IMTA0035, 148 total pages.
International Search Report for PCT/EP2021/050850 dated May 11, 2021, 8 pages.
Written Opinion of the ISA for PCT/EP2021/050850 dated May 11, 2021, 13 pages.
Office Action, issued in Japanese Patent Application No. 2022-543458 dated Sep. 10, 2024.

* cited by examiner

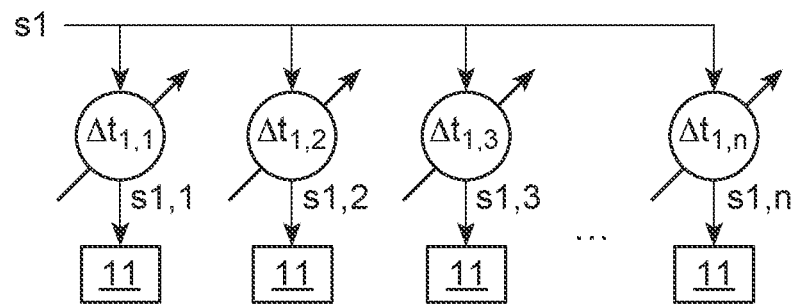
Fig.4
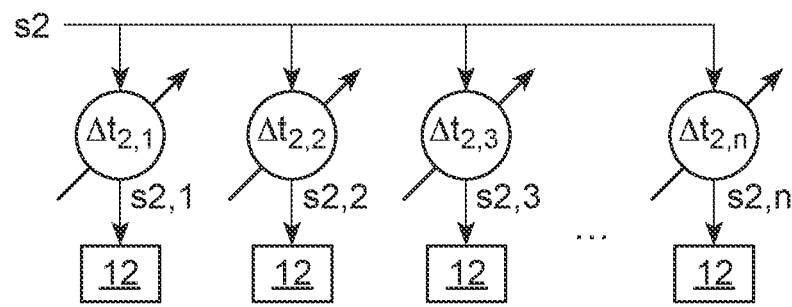
Fig.8
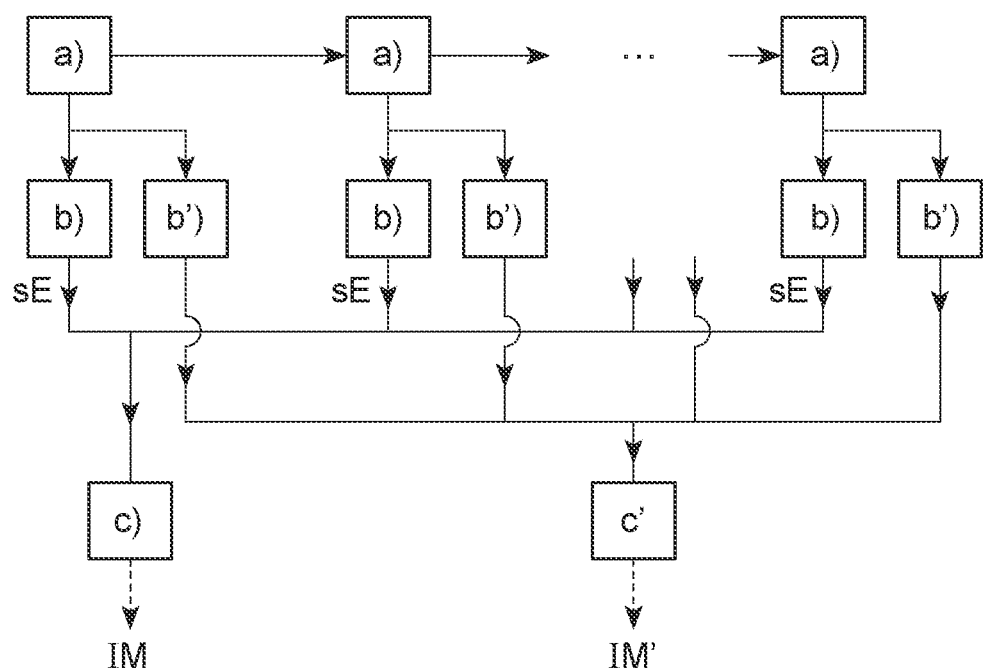

DEPOINTABLE PARAMETRIC ECHOSOUNDER, AND METHOD FOR CHARACTERIZING A PORTION OF THE SUB-BOTTOM OF A SUBAQUATIC ENVIRONMENT

CROSS-REFERENCE TO RELATED APPLICATIONS

This application is the U.S. national phase of International Application No. PCT/EP2021/050850 filed Jan. 15, 2021 which designated the U.S. and claims priority to FR2000464 filed Jan. 17, 2020, the entire contents of each of which are hereby incorporated by reference.

BACKGROUND OF THE INVENTION

Field of the Invention

The present invention generally relates to the field of echosounders, i.e. depth measuring equipment such as sonars, using acoustic wave reflection.

It relates in particular to an echosounder for exploring the sub-bottom content of an underwater environment.

It more particularly relates to a parametric echosounder configured:

to transmit, in the underwater environment:
  a first acoustic wave varying at a first frequency and a second acoustic wave varying at a second frequency, or
  a modulated acoustic wave comprising a first component and a second component varying at said first frequency and said second frequency, respectively, and
in response to said transmission, to pick up an echo signal of frequency equal to the difference between said first frequency and said second frequency.

It also relates to an associated method for characterizing a portion of the sub-bottom of an underwater environment.

Description of the Related Art

Exploration of the sub-bottom content of an underwater environment is an important issue, especially in maritime field.

Indeed, it is common practice to place installations, such as pipelines and cables for telecommunications or electricity transmission, directly on the seabed. However, these installations may then get buried in a layer of sediment or sand, which makes them difficult to locate and characterize.

A particular echosounder for sounding the content of such a sediment layer is described in the article "Feasibility of B-Scan Imaging in Sediment by Means of Parametric Transmission Technique", by J. Marchal and P. Cervenka (Acta Acustica united with Acustica, volume 90 (2004) pages 62-69).

The echosounder described in this article comprises a large-diameter transmitter, of the piston type, driven in such a way as to transmit a first acoustic wave varying at a first frequency, as well as a second acoustic wave varying at a second frequency. Each of these two waves is transmitted vertically, below the transmitter. They are thus superposed on each other all along the water column located directly below the transmitter.

As the water response to a variation of density is slightly non-linear, the superposition of the first and second acoustic waves generates, directly in water, an additional acoustic wave, of frequency equal to the difference between the first frequency and the second frequency. This non-linear mixing effect is generally called "parametric effect". It corresponds in a way to a non-linear self-demodulation, directly in water, of the modulated wave consisted by the superposition of the first and second acoustic waves.

This additional acoustic wave, which is hence generated all along the water column located below the transmitter, propagates vertically and reaches a point of the bottom located directly below the transmitter. It thus allows sounding the underwater environment sub-bottom, below the point in question.

The absorption coefficient of the additional acoustic wave in the sediment layer to be sounded is lower than the absorption coefficients of the first and second acoustic waves, because the frequency of the "low-frequency" additional acoustic wave is lower than those of the first and second acoustic waves. On the other hand, generating this additional acoustic wave directly in water, by non-linear mixing, makes it possible to benefit from a higher directivity than if the additional acoustic wave is transmitted directly by the transmitter.

The just-described echosounder may be placed successively at different positions, at the surface of water, in order to sound the sediment layer at different points of the bottom. This makes it possible to then generate a two-dimensional or three-dimensional image representative of the content of this layer.

Such a sounding is however time-consuming and inconvenient.

SUMMARY OF THE INVENTION

In this context, the present invention proposes a new type of parametric echosounder making it possible to generate a sound wave directly in water, by parametric effect, wherein the propagation axis of this wave can be modified, without moving nor pivoting the echosounder, by an electronic driving of the echosounder transducers.

More particularly, it is proposed according to the invention a parametric echosounder comprising:
  a transmitting antenna comprising several transducers,
  at least one receiver, and
  a driving and acquisition system configured to execute the following steps:
  a) driving said transducers so that they transmit in an underwater environment a first acoustic wave having a first frequency and a second acoustic wave having a second frequency, the first wave and the second wave superposing each other along a superposition axis directed towards a point of the underwater environment bottom, each transducer being driven by a transmit signal, the different transmit signals of the different transducers having predetermined delays with respect to each other, and
  b) acquiring an echo signal, of frequency equal to the difference between said first frequency and said second frequency, picked up by said receiver in response to the transmission made at step a), the driving and acquisition system being moreover configured to:
  execute all steps a) and b) several times, by varying a part at least of said delays from one execution of step a) to the next, in such a way as to modify the orientation of said superposition axis from one execution of step a) to the next, and to
  c) determine, based on the echo signals acquired during the different executions of step b), a two-dimensional or three-dimensional image representative of the content of the underwater environment sub-bottom below each of said points of the bottom.

After each execution of step a), an additional acoustic wave, of frequency equal to the difference between the first frequency and the second frequency, is generated directly in water by non-linear mixing of the first acoustic wave with the second acoustic wave, along said superposition axis. This "low-frequency" additional acoustic wave then propagates parallel to said superposition axis. The point of the bottom it reaches, located in the continuation of this axis, can thus be selected by a suitable choice of the delays between transmit signals.

The parametric echosounder according to the invention thus makes it possible, thanks to a suitable electronic driving of the antenna transducers, to sound the content of the underwater environment sub-bottom below different points of the bottom, with a "low-frequency" acoustic wave penetrating well into this sub-bottom, and without having to move the echosounder for that purpose.

However, transmitting a high acoustic power turns out to be far more difficult with the parametric echosounder according to the invention than with an echosounder comprising a single large-size transducer (such as in the above-mentioned article of J. Marchal and P. Cervenka), pivotally mounted so that it can be pointed at different points of the bottom.

Indeed, for a transmitting antenna consisted of a single transmitter occupying the whole antenna surface, each point of the antenna surface contributes to the transmission of the acoustic waves produced.

On the other hand, for a transmitting antenna consisted, as here, of several separate transducers distributed at different points of the antenna surface, only a part of the antenna surface, consisted by all the respective transmitting surfaces of these transducers, contributes to the transmission of the acoustic waves produced.

Now, the efficiency of the parametric process of non-linear mixing in water is generally low, of the order of a few percent at most, and decreases strongly as the power of the acoustic waves to be mixed decreases. It is therefore crucial for a parametric echosounder to emit very high acoustic powers $P_A$, for example of the order of 230 decibels at 1 metre distance from the transducer(s) (the power value $P_A$ in decibels being equal to 10 log ($P_A/P_{Aref}$), where the reference acoustic power $P_{Aref}$ is that of a pressure wave of 1 micropascal amplitude).

Making a parametric echosounder with a transmitting antenna is thus particularly difficult technically. The transducers used must indeed be able to transmit very high power density per surface unit (typically higher than ten watts per square centimetre). And above all, these transducers must then be driven by transmit signals having a high electrical power, which requires one or several, usually cumbersome, power amplifier(s) and which complexifies the electronics for driving these transducers.

Despite these technical difficulties, a parametric echosounder comprising such a transmitting antenna with several transducers is particularly interesting. Indeed, driving in a purely electronic way the direction of propagation of the acoustic wave, generated by parametric effect, makes it possible to modify very rapidly this direction.

This allows in particular taking a two-dimensional or three-dimensional image representative of the content of a sediment layer more rapidly than by mechanically pivoting a single large-size transducer.

This also allows compensating "in real time" (with a very short latency time typically lower than 0.1 second), at transmission, for the parasitic roll or pitch movements of the echosounder, in such a way that the acoustic waves transmitted point to well-determined directions, independently from these parasitic movements.

Moreover, a transmitting antenna with several transducers offers a great flexibility in the choice of transmission sequences, thus allowing many different sounding configurations, potentially mixing a parametric sounding and sounding without frequency mixing of the underwater environment bottom.

The echosounder according to the invention may comprise a receiving antenna that comprises the above-mentioned receiver, as well as other receivers of the same type. Such a receiving antenna with several receivers allows a selective reception from an angular point of view: it allows the driving and acquisition system to select a given direction of reception. The echo signal acquired at step b) is then representative of a low-frequency acoustic wave having a well-determined direction of propagation, which is the direction of reception in question, selected by the driving and acquisition system (instead of this echo signal being representative of any acoustic wave received, independently of its direction of propagation).

Other non-limiting and advantageous features of the echosounder according to the invention, taken individually or according to all the technically possible combinations, are the following:

the driving and acquisition system is configured to, at step a):

drive each transducer of a first group of said transducers by a first transmit signal varying over time at said first frequency, the transducers of this first group transmitting said first acoustic wave, the different first transmit signals having first, predetermined, delays with respect to each other, drive each transducer of a second group of said transducers by a second transmit signal varying over time at said second frequency, the transducers of this second group transmitting said second acoustic wave, the different second transmit signals having second, predetermined, delays with respect to each other, and vary said first delays and/or said second delays from one execution of step a) to the next, in such a way as to modify the orientation of said superposition axis from one execution of step a) to the next;

the driving and acquisition system is configured in such a way that:

said transmit signals each comprise a first component and a second component varying over time with said first frequency and with said second frequency, respectively, and in such a way that the transducers of the antenna transmit, at step a), a modulated acoustic wave propagating along said superposition axis, composed of said first acoustic wave and said second acoustic wave;

the transmitting antenna has a two-arm cross shape, certain of said transducers being arranged in a line one after the other along the first arm of the antenna, the other transducers of the antenna being arranged in a line one after the other along the second arm of the antenna;

the transducers of first group form the first arm of the antenna and the transducers of the second group form the second arm of the antenna, said first delays being such that the first acoustic wave propagates parallel to a first transmission plane, as a first beam having a narrow cross-section in a direction perpendicular to the first transmission plane and elongated parallel to the first transmission plane, said second delays being such that the second acoustic wave propagates parallel to a second transmission plane, as a second beam having a narrow cross-section along a direction perpendicular to the second transmission plane and elongated parallel to the second transmission plane, said superposition axis being located at the intersection between the first transmission plane and the second transmission plane, and the driving system is configured to, from one execution of step a) to the next:

vary said first delays in order to pivot the first transmission plane about a first scanning axis perpendicular to the first arm of the antenna, and/or vary said second delays in order to pivot the second transmission plane about a second scanning axis perpendicular to the second arm of the antenna;

said transducers are arranged in such a way as to form a matrix of several lines and several columns, the transducers being respectively located at the different intersections between the lines and columns of the matrix;

the first and second delays are such that the first and second acoustic waves are transmitted respectively as a first collimated beam and a second collimated beam, each centred to said superposition axis;

the transducers of the first group occupy several distinct areas of said matrix, one or several of the transducers of the second group being interposed between any two of said areas;

each transducer of the first group has for nearest neighbours transducers of the second group;

several of said transducers each comprise an element made of a piezoelectric material as well as a mechanical device applying a compressive stress to said piezoelectric material element;

this compressive stress is higher than 7 bars, or even higher than 15 bars;

each transducer is adapted to transmit acoustic waves in the underwater environment at frequencies higher than 50 kilohertz;

the receiver is adapted to pick up and convert into electric form acoustic waves whose frequency is comprised in a reception bandwidth, the reception bandwidth being between 0 and 30 kilohertz;

the driving and acquisition system is configure in such a that the first and second frequencies are each higher than 50 kilohertz;

the driving and acquisition system is configured in such a way that the difference between the first frequency and the second frequency is comprised in said reception bandwidth;

the driving and acquisition system is configured in such a way that the difference between the first frequency and the second frequency is lower than 30 kilohertz;

the driving and acquisition system is configured to vary the difference between said first frequency and said second frequency, from one execution of step a) to the next;

the driving and acquisition system is moreover configured to, after each execution of step a), acquire an additional echo signal, of frequency equal to said first frequency or to said second frequency, picked up by one at least of said transducers in response to the transmission made at step a);

the driving and acquisition system is configured to determine an image representative of a portion of the underwater environment on the basis of said additional echo signals;

the driving and acquisition system is configured to determine depths of said points of the bottom on the basis of said additional echo signals;

the driving and acquisition system is moreover configured to, at step a), drive said transducers in such a way that an incidence angle, formed between said superposition axis and an axis perpendicular to the underwater environment bottom, is greater than a limit incidence angle;

the limit incidence angle is equal to 15 degrees.

The invention also relates to a method for characterizing a portion of the sub-bottom of an underwater environment, implemented by means of a parametric echosounder as described hereinabove, during which the driving and acquisition system executes the following steps:

a) driving said transducers so that they transmit in an underwater environment a first acoustic wave having a first frequency and a second acoustic wave having a second frequency, the first wave and the second wave superposing each other along a superposition axis directed towards a point of the underwater environment bottom, each transducer being driven by a transmit signal, the different transmit signals of the different transducers having predetermined delays with respect to each other, and b) acquiring an echo signal, of frequency equal to the difference between said first frequency and said second frequency, picked up by said receiver in response to the transmission made at step a), all steps a) and b) being executed several times, by varying a part at least of said delays from one execution of step a) to the next, in such a way as to modify the orientation of said superposition axis from one execution of step a) to the next, the method further comprising the following step:

c) determining, based on the echo signals acquired during the different executions of step b), a two-dimensional or three-dimensional image representative of the content of the underwater environment sub-bottom below each of said points of the bottom.

The optional features presented hereinabove in relation with a device can also be applied to the just-described method.

BRIEF DESCRIPTION OF THE DRAWINGS

The following description in relation with the appended drawings, given by way of non-limiting examples, will allow a good understanding of what the invention consists of and of how it can be implemented.

In the appended drawings.

DESCRIPTION OF THE PREFERRED EMBODIMENTS

Figure 1:
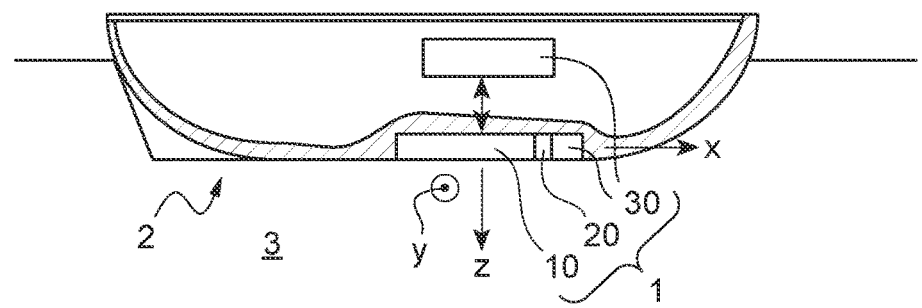
FIG. 1 schematically shows a vessel provided with an echosounder according to a first embodiment, viewed from the side, FIG. 2 schematically shows a vessel provided with an echosounder according to a first embodiment, viewed from below, FIG. 3 schematically shows different elements of the echosounder of FIGS. 1 and 2, FIG. 4 schematically shows a way to drive transducers of the echosounder of FIGS. 1 and 2, FIG. 5 schematically shows acoustic wave beams, transmitted at a first moment by the echosounder of FIGS. 1 and 2, FIG. 6 schematically shows acoustic wave beams, transmitted at a second moment by the echosounder of FIGS. 1 and 2, FIG. 7 schematically shows acoustic wave beams, transmitted at a third moment by the echosounder of FIGS. 1 and 2, FIG. 8 schematically shows steps of a method for characterizing a portion of the sub-bottom of an underwater environment, implemented by the echosounder of FIGS. 1 and 2, FIG. 9 schematically shows the area occupied, at a given moment, by a first acoustic wave transmitted by the echosounder of FIGS. 1 and 2, viewed from the front, FIG. 10 schematically shows the area occupied, at a given moment, by a first acoustic wave transmitted by the echosounder of FIGS. 1 and 2, viewed from the side, FIG. 11 schematically shows, for the same moment as in FIGS. 9 and 10, the area occupied by a second acoustic wave transmitted by the echosounder, viewed from the side; it also shows, at the same moment, the areas occupied by additional second acoustic waves transmitted by the echosounder, FIG. 12 schematically shows, for the same moment as in FIGS. 9 and 10, the area occupied by a second acoustic wave transmitted by the echosounder, viewed from the front, FIG. 13 schematically shows, simultaneously, at the same moment as in FIGS. 9 and 11, the areas respectively occupied by these first and second acoustic waves, viewed from the front.
Figure 2:
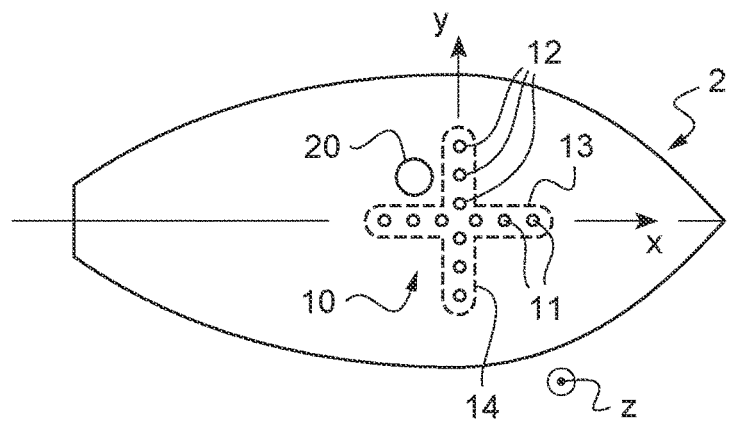
Figure 3:
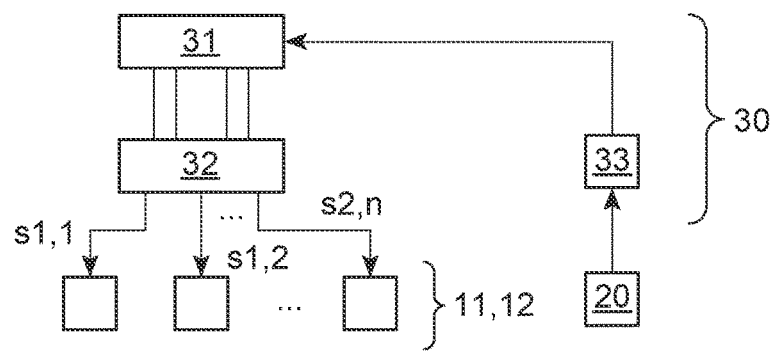
Figure 5:
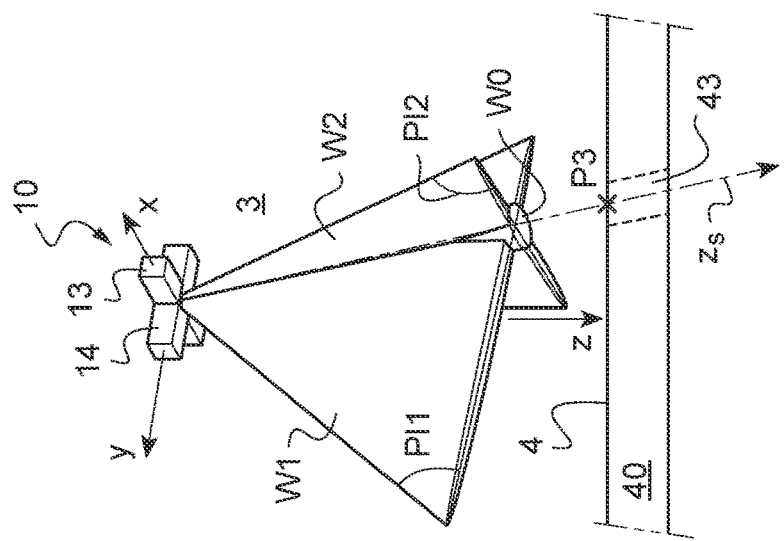
Figure 15:
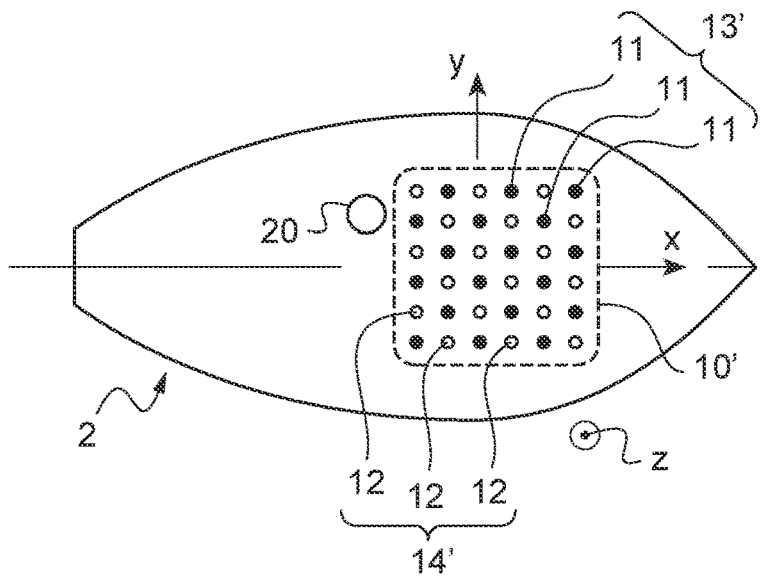
Figure 16:
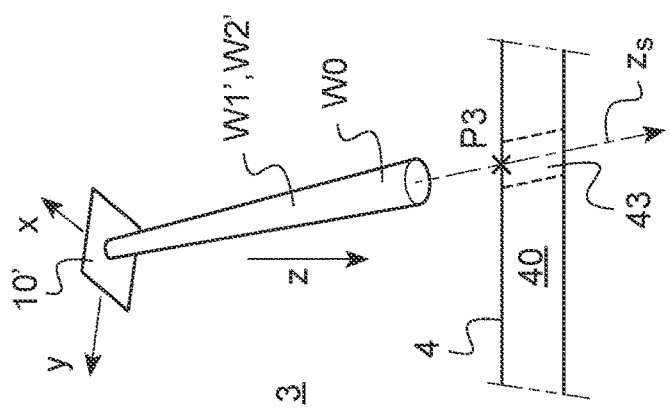

FIGS. 1 and 2, on the one hand, and FIG. 15, on the other hand, schematically show a first and, respectively, a second embodiment of a particular parametric echosounder 1; 1' making it possible to take a two-dimensional or three-dimensional image of the content of the sub-bottom 40 of an underwater environment 3 (c.f.: FIGS. 5 and 16 in particular), in a fast, accurate and convenient manner.

The underwater environment 3 in question extends under the water surface, below and possibly around the echosounder 1; 1'. The sub-bottom 40 thereof, essentially solid, is composed for example of sediment, such a sand, or rocks. The bottom 4 of the underwater environment 3 is located at the frontier between the water and this sub-bottom 40.

This parametric echosounder 1; 1' can be fitted on a vessel 2, of the submersible or surface type, that is manned or configured to operate without a person on board. It comprises a transmitting antenna 10; 10' to transmit acoustic waves in the underwater environment 3 surrounding it. This antenna 10; 10' can for example be installed in a housing provided for this purpose in the hull of the vessel 2, as shown in the figures.

Whatever the embodiment, the transmitting antenna 10; 10' comprises several electro-acoustic transducers 11, 12. These transducers can be driven independently of each other. Each of them is adapted to transmit acoustic waves in the underwater environment 3, at frequencies higher than 50 kilohertz, or higher than 100 or even than 150 kilohertz. They may for example be ultra-sound transducers 11, 12 adapted to transmit acoustic waves in a transmission bandwidth (−3 dB bandwidth), which is between 20 kilohertz and 1 megahertz.

At least three of the transducers 11, 12 of the antenna 10; 10' are not aligned with each other. In other words, the transducers 11, 12 of the antenna 10; 10' are not only distributed over a same line. The positions they occupy are two-dimensionally distributed, over a whole given surface, in order for example to form together a cross (as in the first embodiment of FIG. 2) or a rectangular matrix (as in the second embodiment, of FIG. 15).

The differences between the first and second embodiments of the echosounder 1; 1' shown in FIGS. 2 and 15, respectively, mainly relate to the way these transducers 11, 12 are distributed with respect to each other at the surface of the antenna 10; 10' and the number of transducers comprised in the antenna 10; 10'. These differences thus also relate to the shape of the beams W1, W2; W1', W2' transmitted by the antenna, illustrated in FIGS. 5 and 16). It also relates to the detail of the driving of these transducers 11, 12.

These two embodiments have nevertheless many features in common. Therefore, from one embodiment to another, common elements are as far as possible marked with the same reference signs and are not necessarily described in each case.

In these two embodiments, and indeed whichever embodiment is considered, the echosounder 1; 1' further comprises at least one receiver 20 to pick up low-frequency acoustic waves. The receiver 20 is an electro-acoustic transducer of the hydrophone type. The receiver 20 is able to pick up and convert into electric form acoustic waves whose frequency is comprised in a reception bandwidth that extends in particular below 30 kilohertz. This reception bandwidth, which corresponds for example to the −3 dB bandwidth of the receiver 20, can for example be between 0 and 20 kilohertz, between 0 and 30 kilohertz, or also between 10 and 30 kilohertz. This receiver 20 is not necessarily directive.

As shown in the Figures, the echosounder 1; 1' comprises a single receiver 20 of this type. As an alternative, the echosounder could however comprise several such receivers forming together a receiving antenna. Having thus several distinct receivers, located at different positions on the echosounder, allows a selective reception from the angular point of view. Indeed, this allows, by an electronic processing of all the signals picked up by these receivers, obtaining one or several echo signals each representative of an acoustic wave that, before being received by the echosounder, was propagating in the underwater environment with a given propagation direction, selected by the electronic processing in question.

By way of example, in a variant of the first embodiment of FIG. 2, the receiving antenna in question could comprise four receivers as described hereinabove, the four quadrants delimited by the two arms of the Mills-cross-shaped transmitting antenna being then each occupied by one of these receivers, arranged in a rectangular or square configuration.

In other variants, the different receivers of the receiving antenna could for example be located along a same line, to form a linear receiving antenna.

The echosounder 1; 1' also comprises a driving and acquisition system 30; 30' to drive the transducers 11, 12 of the antenna 10; 10', acquire the low-frequency echo signals $s_E$ picked up by the receiver 20 and determine from these echo signals the two-dimensional or three-dimensional image, IM, of the content of the sub-bottom 40 of the underwater environment 3, mentioned hereinabove.

The driving and acquisition system 30; 30' is more precisely configured to execute the following steps of a method for characterizing a portion of the sub-bottom 40 of the underwater environment 3 (method shown in FIG. 8):

a) driving the transducers 11, 12 of the transmitting antenna 10; 10' so that they transmit in the underwater environment 3 a first acoustic wave having a first frequency f1 and a second acoustic wave having a second frequency f2, the first wave and the second wave superposing each other along a superposition axis $z_s$ directed towards a given point P1, P2, P3 of the underwater environment bottom 4 (FIGS. 5 to 7), each transducer 11, 12 being driven by a transmit signal $s_{1,1}$, $s_{1,2}$, $s_{1,3}$, $s_{2,1}$, $s_{2,2}$, $s_{2,3}$ ... that is associated therewith, the transmit signals of the different transducers 11, 12 having predetermined delays with respect to each other (FIG. 4), b) acquiring an echo signal $s_E$, picked up by the receiver 20 in response to the transmission made at step a), and whose frequency $f_{LF}$ is equal to the absolute value of the difference between the first frequency f1 and the second frequency f2, all steps a) and b) being executed several times, by varying a part at least of said delays from one execution of step a) to the next, in such a way as to modify the orientation of the superposition axis $z_s$ from one execution of step a) to the next, and c) determining, based on the echo signals $S_E$ acquired during the different executions of step b), the two-dimensional or three-dimensional image IM, mentioned hereinabove, which is representative of the content of the sub-bottom 40 of the underwater environment 3, below each of said points P1, P2, P3 of the bottom 4.

The driving and acquisition system 30; 30' is configured in such a way that the first and second frequencies f1 and f2 are higher than 50 kilohertz, or higher than 100, or even, as herein, higher than 150 kilohertz. It is moreover configured in such a way that the difference between the first and second frequencies f1 and f2 is comprised in the above-mentioned reception bandwidth. Here, the driving and acquisition system 30; 30' is more precisely configured in such a way that the difference between the first and second frequencies f1 and f2 is between 15 and 30 kilohertz. The transmit signals $s_{1,1}$, $s_{1,2}$, $s_{1,3}$, $s_{2,1}$, $s_{2,2}$, $s_{2,3}$ ... that drive the transducers 11, 12 are produced by the driving and acquisition system 30; 30'.

As an alternative, the difference between the first and second frequencies f1 and f2 could however be smaller, this difference being for example lower than 10 kilohertz. The values of the first and second frequencies f1 and f2 could also be lower than what is indicated hereinabove, each of these frequencies being for example possibly between 20 and 50 kilohertz.

In any case, the difference |f1−f2| between the first and second frequency f1 and f2 is preferably lower than a quarter of the arithmetic average (f1+f2)/2 of the first and second frequencies f1 and f2. Here, for example, this difference |f1−f2| is between a quarter and a sixth of the arithmetic average (f1+f2)/2 of the first and second frequencies f1 and f2. Such a ratio makes it possible to optimize the efficiency of the non-linear mixture of the first acoustic wave with the second acoustic wave.

After each execution of step a), an additional acoustic wave, whose frequency $f_{LF}$ is equal to the absolute value of the difference between the first frequency f1 and the second frequency f2, is generated directly in water, along the superposition axis $z_s$, by non-linear mixing of the first acoustic wave with the second acoustic wave. This additional acoustic wave is called "low-frequency wave" hereinafter. In the specialized literature, such an acoustic wave, produced directly in the underwater environment by non-linear mixing, is sometimes called "parametric wave", or also "secondary wave" (the first and second acoustic waves being then called "primary waves"). It propagates parallel to the superposition axis $z_s$, and it thus reaches the point P1, P2, P3, ... of the bottom 4 towards which the superposition axis $z_s$ is directed (apart from potential effects of acoustic refraction).

This low-frequency wave generally penetrates better in the sub-bottom 40 of the underwater environment 3 than the first and second acoustic waves, whose frequencies f1 and f2 are higher. It hence makes it possible to sound more deeply the content of this sub-bottom, below the point P1, P2, P3 in question. In this sub-bottom 40, when the low-frequency acoustic wave meets an element whose rigidity or density is different from the rest of the sub-bottom, such as a portion of pipeline buried under sediment, a part of the low-frequency wave is reflected by this element like an echo. A reception time of this acoustic wave by the echosounder gives then information about the distance between the echosounder and the so-detected reflective element.

Figure 6:
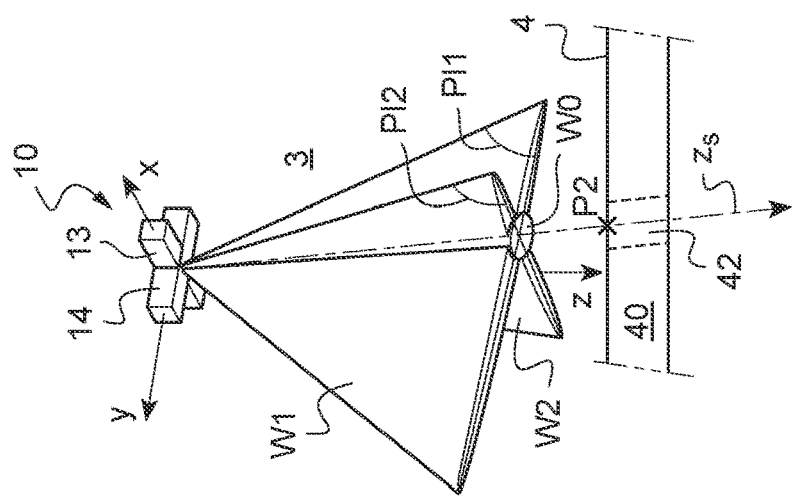
Figure 7:
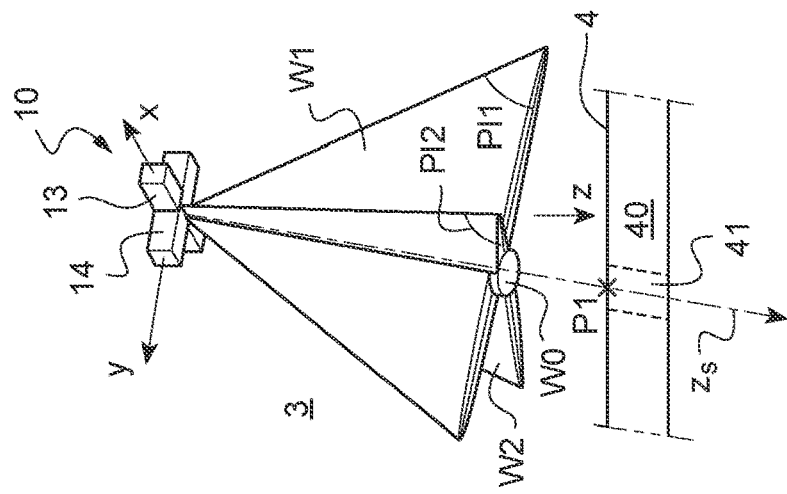

More generally, the acoustic wave of frequency $f_{LF}$, reflected by the underwater environment sub-bottom 40 in response to the transmission of the first and second acoustic waves, contains information about the presence of more or less reflective elements in a column 41, 42, 43 of this sub-bottom 40 that extends below the point P1, P2, P3 of the bottom 4 towards which the superposition axis $z_s$ is directed, and about the depth at which each of these elements is located, within this column. In other words, this reflected acoustic wave makes it possible to determine a kind of one-dimensional image of the content of the sub-bottom 40, along this column 41, 42, 43 (FIGS. 5 to 7). It is this reflected acoustic wave, whose frequency is equal to the absolute value of the difference between the first and second frequencies f1 and f2, which is picked up at step b) by the receiver 20 and converted into electrical form to give the echo signal $s_E$.

As the directions of propagation of the first and second acoustic waves transmitted at step a) depend directly on the delay values between transmit signals, the direction of the superposition axis $z_s$, along which these first and second waves superpose each other, can be controlled in a purely electronic manner by adjusting these delays, in order to vary the orientation of the superposition axis $z_s$ from one execution of step a) to the next.

The respective contents of several elementary contents 41, 42, 43, which extend below different points P1, P2, P3 of the bottom 4, are then sounded, here successively, during the different executions of steps a) and b). At step c), the two- or three-dimensional image IM determined by the driving and acquisition system 30; 30' can for example be obtained by placing side-by-side, column by column, the one-dimensional sonar images representative of the content of these different columns 41, 42, 43.

By way of example, when the orientation of the superposition axis $z_s$ varies from one execution of step a) to the next in such a way that this axis points successively to different points P1, P2, P3 distributed, on the bottom 4 of the underwater environment 3, along a same line, the echosounder 1; 1' then takes a two-dimensional image IM corresponding to a cross-sectional view of the sub-bottom 40 of the underwater environment 3, according to a cross-sectional plane passing through this line (and by the antenna 10; 10' of the echosounder).

The parametric echosounder 1; 1' according to the invention thus makes it possible to take, in a purely electronic manner, thanks to a suitable driving of the transducers 11, 12 of the antenna 10; 10', a two-dimensional or three-dimensional image IM, representative of the content of the underwater environment sub-bottom 40. Advantageously, this image is obtained more rapidly than by mechanically pivoting a single large-size transducer. This also allows compensating "in real time" (with a very short latency time typically lower than 0.1 second), at transmission, for the parasitic roll or pitch movements of the echosounder 1; 1', in such a way that the acoustic waves transmitted point to well-determined directions, independently from these parasitic movements.

After this presentation of the main features of the echosounder 1; 1', the structure and operation thereof will now be described in more detail.

Some features of the electrical modules and transducers 11; 12 that are used will be first presented.

The structure of the transmitting antenna 10 of the first embodiment, with a "Mills cross" structure, and its driving mode, will be described in a second time, with reference to FIGS. 2 and 5 to 7.

The structure of the transmitting antenna 10' of the second embodiment and its driving mode will then be described with reference to FIGS. 15 to 18.

Transmission and acquisition techniques making it possible to increase the rate of acquisition of the two- or three-dimensional image of the underwater environment sub-bottom 40 by a kind of multiplexing will be described thereafter. A version of this technique, corresponding in a way to a frequency multiplexing, is described with reference to FIGS. 9 to 14. These techniques can be applied both to the first and the second embodiment.

Transducers and Driving Electronics

As explained hereinabove, thanks to its antenna 10; 10' formed of several separate transducers 11; 12, the parametric echosounder 1; 1' according to the invention can be depointed in a purely electronic manner, like a non-parametric multi-beam echosounder, which is particularly interesting.

But, as it is a parametric echosounder, it is crucial that the acoustic waves transmitted have very high acoustic powers. Indeed, the efficiency of the parametric process of non-linear mixing in water is generally low, of the order of a few percent at most, and decreases strongly as the power of the acoustic waves to be mixed decreases.

To reach the desired acoustic powers, whereas only a portion of the surface of this antenna 10; 10' contributes to the transmission of acoustic waves, each transducer 11, 12 of the antenna 10; 10' is here made from one or several elements made of a piezoelectric material, subjected to a strong compressive stress by a mechanical device, for example of the screw-bolt type. In the absence of electrical excitation, this piezoelectric element(s) are therefore subjected to this strong prestress. This allows applying subsequently very high power supply voltages to the piezoelectric elements (higher than several hundreds of volts), and hence to generate very intense acoustic waves, while avoiding that these elements work in extension, limiting the risks of breakage. In practice, the compression stress applied to the piezoelectric elements by the mechanical device in question is at least higher than 7 bars (in the absence of electrical excitation), or even higher than 15 bars. And each transducer 11, 12 of the antenna 10; 10' is capable of transmitting an acoustic wave having, in the immediate proximity of the transducer, a power density per surface unit higher than or equal to 20 watts per square centimetre.

In a variant of the echosounder for which the first and second frequencies would be lower than here, for example of the order 10 kilohertz instead of being higher than 150 kilohertz, the compressive stress applied to the above-mentioned piezoelectric elements would be still higher, for example higher than 100 bars. The driving and acquisition system 30; 30' of the echosounder 1; 1' here comprises
 a logical unit 31, which comprises at least a processor and a memory,
 a conditioning module 32, which delivers the transmit signals $s_{1,1}, s_{1,2}, s_{1,3}, s_{2,1}, s_{2,2}, s_{2,3} \ldots$ in a form suitable for driving the transducers 11, 12, and
 an acquisition module 33, to amplify and convert into a digital format the echo signals $s_E$ picked up by the receiver 20, before transmitting them to the logical unit 31.

The conditioning module 32 produces the transmit signals $s_{1,1}, s_{1,2}, s_{1,3}, s_{2,1}, s_{2,2}, s_{2,3} \ldots$ based on the signals received from the logical unit 31. It may comprise one or several digital-analog converters, as well as filters to conform the transmit signals or to perform impedance matchings with transducers 11, 12. Anyway, the conditioning module 32 comprises amplifiers, here one per transducer 11, 12, each capable of delivering an output electrical voltage of about one hundred volts at least, to drive the corresponding transducer. These amplifiers, herein of the "Pulse Width Modulation" (PWM) type, allow amplifying the transmit signals in such a way that their amplitudes are high enough to generate acoustic waves having a power density per surface unit higher than 10, or even 20 watts per square centimetre. Here, the acoustic wave generated by each transducer, considered alone, has a power density per surface unit that, in the immediate proximity of the antenna 10; 10' (for example at a distance from the antenna between 10 and 50 cm), is more precisely between 10 and 40 watts per square centimetre.

The total power of the first, or the second, ultrasound wave transmitted by the antenna 10 is here of the order of 218 dB. This transmission power is rather reduced with respect to what is used in a usual parametric sonar. Even so, the image obtained, representative of the content of the environment sub-bottom 40 is of good quality, then indicating a good signal-to-noise ratio. This good signal-to-noise ratio (despite the reduced transmission power) is explained for example by the fact that the buried objects (which are here scanned) are buried under a few metres deep, and not a few tens of metres as is usually the case. Moreover, here, the noise that may interfere with the measurements comes solely from the reverberation of the waves in these sediment layers. As the parametric beam is very thin, this reverberation is very reduced, and the signal is thus exploitable.

For the first embodiment of FIG. 2, the total electrical power consumed by the driving electronics, during a transmission sequence, is here between 2 and 5 kilowatts. Therefore, at resonance, for each transducer 11, 12 of the antenna 10; 10' consisted of piezoelectric elements, 90% of the energy applied is converted into acoustic power.

Moreover, in the embodiments described here, the transducers of the antenna 10; 10' are distributed into a first group 13; 13' of transducers 11 and a second group 14; 14' of transducers 12 (FIGS. 2 and 15), and the driving and acquisition system 30; 30' is configured to:

drive each transducer 11 of the first group by a first transmit signal $s_{1,1}, s_{1,2}, s_{1,3} \ldots$ varying over time at the first frequency f1 (the first acoustic wave mentioned hereinabove being then transmitted by this first group of transducers), and to drive each transducer 12 of the second group by a second transmit signal $s_{2,1}, s_{2,2}, s_{2,3} \ldots$ varying over time at the second frequency f2 (the first acoustic wave mentioned hereinabove being then transmitted by this second group of transducers).

The first transmit signals $s_{1,1}, s_{1,2}, s_{1,3} \ldots$ have predetermined delays with respect to each other. More precisely, each of these first signals has a first delay $\Delta t_{1,1}, \Delta t_{1,2}, \Delta t_{1,3} \ldots$, with respect to a first reference signal $s_1$ (which varies at frequency f1), as schematically shown in FIG. 4. It may also be provided that the different first transmit signals $s_{1,1}, s_{1,2}, s_{1,3} \ldots$ are each obtained based on this same reference signal $s_1$, by time shifting. Modifying one of these first delays $\Delta t_{1,1}, \Delta t_{1,2}, \Delta t_{1,3} \ldots$ of course amounts to modify the delay of the corresponding first transmit signal, with respect to the other transmit signals.

In the same way, the second transmit signals $s_{2,1}, s_{2,2}, s_{2,3} \ldots$ have predetermined delays with respect to each other. Here, each of these second signals has a second delay $\Delta t_{2,1}, \Delta t_{2,2}, \Delta t_{2,3} \ldots$ with respect to a second reference signal $s_2$, which varies at frequency f2. Here again, the second transmit signals $s_{2,1}, s_{2,2}, s_{2,3} \ldots$ can for example be obtained based on this same second reference signal s2, by time shifting.

Mills-Cross Transmitting Antenna

As already indicated, in the first embodiment, the transmitting antenna 10 of the echosounder 1 has a two-arm cross shape, usually called Mills cross (FIG. 2).

Herein, the transducers 11 of the first group of transducers mentioned hereinabove, driven at the first frequency f1, form the first arm 13 of the antenna.

They are arranged in a line, one after each other, along this first arm 13.

And the transducers 12 of the second group of transducers, driven at the second frequency f2, form the second arm 14 of the antenna. They are also arranged in a line, one after each other, along this second arm 14.

In this first embodiment, at step a), the first acoustic wave is hence here transmitted by the transducers 11 of the first arm 13 of the antenna, whereas the second acoustic wave is transmitted by the transducers 12 of the second arm 14 of the antenna.

The first and second arms 13, 14 form between each other an angle comprised for example between 60 and 120 degrees. Here, these two arms are more precisely perpendicular to each other.

Such a transducer arrangement, in a cross configuration, is known for conventional non-parametric echosounders, for which one of the transducer arms is used in transmission whereas the other is used in reception. But the operation of the echosounder 1 is here very different from such a conventional echosounder. Indeed, the two arms of the cross are here used in transmission, whereas the reception is made, at a frequency different from that of the transmission, by the receiver 20, distinct from the antenna 10, or as an alternative, by the above-mentioned receiving antenna.

Here, the antenna 10 is mounted in such a way that the x-axis of the first arm 13 extends parallel to a longitudinal axis of the vessel 2, which extends from the stern to the bow of the vessel. And the y-axis of the second arm 14 of the antenna here extends transversely with respect to the vessel 2. The y-axis is thus perpendicular to the longitudinal axis of the vessel and parallel to the deck thereof. This arrangement of the antenna 10 with respect to the vessel makes an electronic compensation of the parasitic pitch and roll movements of the vessel convenient to implement. The z-axis, represented in the figures as a reference, is perpendicular to the antenna 10, i.e. perpendicular to the two arms 13 and 14 thereof.

Along each arm of the antenna 10, the transducers 11, 12 are distributed over a length that is here longer than 20 centimetres, and even longer than 50 centimetres. Due to its length, each of these arms is capable of transmitting acoustic waves having, parallel to this arm, a reduced angular aperture.

In this first embodiment, the driving and acquisition system 30 of the echosounder 1 is configured to, at step a), give the first delays $\Delta t_{1,1}, \Delta t_{1,2}, \Delta t_{1,3} \ldots$, which are applied to the different first transmit signals $s_{1,1}, s_{1,2}, s_{1,3} \ldots$, such values that the first acoustic wave propagates parallel to a first transmission plane P11, as a first beam W1 having a narrow cross-section, in a direction perpendicular to the first transmission plane P11, and very elongated parallel to this plane (FIG. 5). In this transmission plane, the first beam W1 has a great angular aperture, for example of several tens of degrees, whereas it has a reduced angular aperture perpendicular to this transmission plane, for example lower than 5 degrees (this angular aperture is defined for example as the angular width, at half the peak's maximum representing the acoustic intensity of the first wave in a cross-section of the first beam W1). This first beam W1 is thus like a fan-shaped, shallow layer, often called "scan swath". This first beam W1 represents the area of the underwater environment 3 that is scanned by the first acoustic wave during the propagation thereof.

To obtain that the first acoustic wave propagates as this first beam W1, the driving and acquisition system 30 gives for example each of the first delays $\Delta t_{1,1}, \Delta t_{1,2}, \Delta t_{1,3} \ldots$ a value that is proportional to a position occupied by the corresponding transducer 11 (transducer n°1, n°2, n°3, etc. . . . ) along the first arm 13 (by way of example, if these first delays all have the same value, i.e. there is no time shift between the first transmit signals, the first transmission plane P11, parallel to which the first acoustic wave propagates, extends perpendicular to the x-axis of the first arm 13 of the antenna). The first transmission plane P11 comprises an axis that is perpendicular to the first arm 13, herein by the y-axis, and pivots about this axis as a function of the values given to the first delays (herein, as a function of the coefficient of proportionality between the values of these delays and the positions of the transducers 11 along the first arm 13 of the antenna).

In the same way, at step a), the driving and acquisition system 30 gives the second delays $\Delta t_{2,1}, \Delta t_{2,2}, \Delta t_{2,3} \ldots$ such values that the second acoustic wave propagates parallel to a second transmission plane P12, as a second beam W2 having a narrow cross-section in a direction perpendicular to the second transmission plane P2, and very elongated parallel to this plane (FIG. 5). The second beam W2 has a shape similar to the first beam W1. In particular, the second beam W2 has a reduced angular aperture perpendicular to the second transmission plane P12, for example lower than 5 degrees (width at half the maximum). The second transmission plane P12, to which is centred the second beam W2, comprises an axis perpendicular to the second arm 14 of the antenna, herein by the x-axis, about which it can pivot, as a function of the values given to the second delays.

The superposition axis $z_s$ is located at the intersection between the first transmission plane P11 and the second transmission plane P12 (FIGS. 5 to 7).

And the first and second waves superpose each other mainly within a common beam Wo, formed by the intersection of the first beam W1 and the second beam W2, and centred on the superposition axis $z_s$. In other words, that is only within this common beam Wo that the first and second waves have a substantial acoustic intensity. That is thus within this common beam Wo that the low-frequency acoustic wave is generated efficiently.

The common beam Wo, approximately conical, has a reduced angular aperture, for example lower than 2 degrees, because each of the first and second beams W1, W2 forms the shallow layer described hereinabove. The cross-section of the low-frequency acoustic wave, generated by non-linear mixture in water, is hence not very extended (especially as the mode of generation of this non-linear wave also tends to reduce its transverse extension). This allows sounding the underwater environment sub-bottom 40 with a good lateral resolution.

In order to sound the content of this sub-bottom 40 below different points P1, P2, P3 of the bottom 4, the driving and acquisition system 30 here varies the second delays $\Delta t_{2,1}$, $\Delta t_{2,2}$, $\Delta t_{2,3}$ ... from one execution of step a) to the next, in such a way as to pivot the second transmission plane P12 about the x-axis. An angle of inclination, formed between the z-axis and the second transmission plane P12, thus varies from one execution of step a) to the next (FIGS. 5 to 7). This pivoting of the second transmission plane P12 makes it possible to vary the orientation of the superposition axis $z_s$ (which, during these successive executions, may then scan the whole fan formed by the first beam W1).

This way to scan different points P1, P2, P3 of the bottom 4 is illustrated by all FIGS. 5 to 7, which schematically show the first and second beams W1 and W2 formed by the first and second acoustic waves, for three successive executions of the transmission step a).

Moreover, during this scanning, at transmission step a), the driving and acquisition system 30 drives the transducers 11, 12 of the antenna 10 in such a way that an incidence angle, formed between the superposition axis $z_s$ and an axis perpendicular to the underwater environment bottom, z4, is greater than a limit incidence angle. This limit incidence angle is here equal to 15 degrees.

It is thus avoided that the low-frequency acoustic wave, generated along the superposition axis $z_s$, reaches the bottom 4 with a normal incidence (that is to say a zero incidence angle), and that during the whole scanning of the bottom.

Move that way apart from a normal incidence makes it possible to avoid that low-frequency acoustic waves, specularly or almost-specularly reflected by the bottom 4 or by the interface between two different sedimentary layers, are sent back towards the echosounder 1. This is interesting because the intensity of such waves, thus specularly reflected, is generally far higher than the intensity of the acoustic waves reflected by buried objects such as the pipelines, which are reflected mainly in a diffuse manner. In normal incidence, the acoustic waves specularly reflected by the bottom, far more intense, would thus mask the acoustic waves coming from the buried objects to be detected, thus making the detection of such objects more difficult than here.

Figure 10:
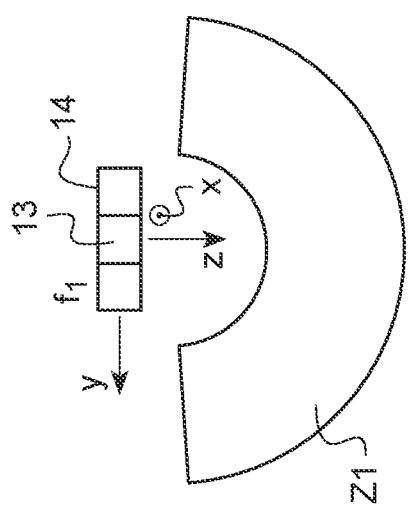
Figure 12:
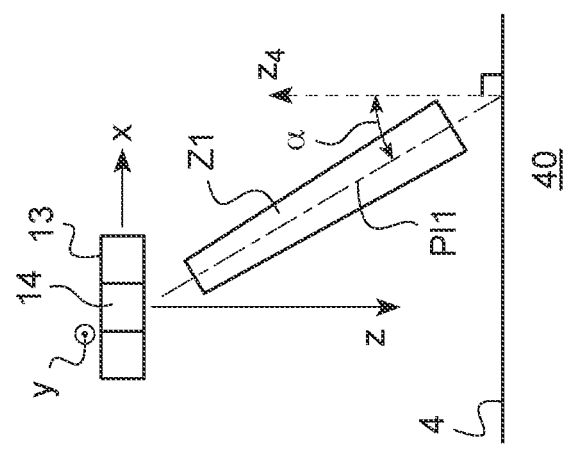

In the scanning mode described herein, to sound the sub-bottom 40 with an incidence angle greater than the limit incidence angle, the driving and acquisition system 30 adjusts the first delays $\Delta t_{1,1}$, $\Delta t_{1,2}$, $\Delta t_{1,3}$ ... in such a way that the first transmission plane P11 is inclined, by an angle $\alpha$, with respect to the axis perpendicular to the bottom z4 (the angle $\alpha$ is the angle formed between the plane P11 and the axis z4). The angle $\alpha$ is greater than the above-mentioned limit incidence angle. The angle $\alpha$ and the axis z4 are shown in FIG. 10, which also shows aspects of high-rate acquisition. The angle $\alpha$ is for example between 15 and 30 degrees.

As regards the second delays $\Delta t_{2,1}$, $\Delta t_{2,2}$, $\Delta t_{2,3}$ ..., they vary from one execution of step a) to the next, as described hereinabove, in order to pivot the second transmission plane P12 about the x-axis.

Therefore, all along this scanning, the incidence angle formed between the superposition axis $z_s$ and the axis perpendicular to the bottom z4 remains greater than the angle $\alpha$, and thus remains greater than the above-mentioned limit incidence angle.

Figure 19:
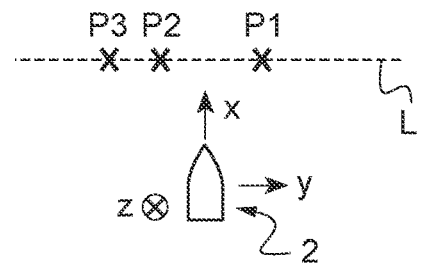

FIG. 19 schematically shows the position of the points P1, P2, P3 of the bottom sounded by the echosounder, in a situation in which the bottom 4 is horizontal as well as the antenna 10. In this situation, the first transmission plane P11 that is thus inclined with respect to the vertical (to avoid a normal incidence sounding), in this case directed towards the front of the vessel 2. The points P1, P2, P3 of the bottom sounded by the echosounder are then distributed along a line L, that extends on the underwater environment bottom, on the front of the vessel 2 and perpendicular to the longitudinal axis of this vessel.

With respect to the just-described scanning mode, it could be provided, as an alternative, to vary the first delays $\Delta t_{1,1}$, $\Delta t_{1,2}$, $\Delta t_{1,3}$ ... from one execution of step a) to the next, in such a way as to pivot the first transmission plane P11 about the y-axis, instead of varying the second delays $\Delta t_{2,1}$, $\Delta t_{2,2}$, $\Delta t_{2,3}$ ....

It could also be provided to vary both the first delays $\Delta t_{1,1}$, $\Delta t_{1,2}$, $\Delta t_{1,3}$ ... and the second delays $\Delta t_{2,1}$, $\Delta t_{2,2}$, $\Delta t_{2,3}$ ... during a series of several successive executions of step a), for example to take a three-dimensional image, representative of the content of the sub-bottom 40 below several points of the bottom that are not all aligned with respect to each other and the whole of which covers an entire surface of the underwater environment bottom.

It is to be noted that the echosounder 1 of this first embodiment poses significant practical difficulties in terms of acoustic intensity to be transmitted. Indeed, the total transmission surface of this Mills-cross antenna 10 is far smaller than for a single transmitter of the "piston" type, or even than for the antenna 10' with a transmitter matrix of the second embodiment. Moreover, a part only of the first acoustic wave superposes to the second acoustic wave (FIG. 5). Therefore, a part only of the first wave and a part only of the second wave participate to the generation, in water, of the low-frequency acoustic wave, further reducing the efficiency of generation of this low-frequency wave.

But using such a Mills-cross antenna (the two arms of which are driven in transmission, respectively at the first frequency f1 and the second frequency f2) makes it possible, in return, to significantly simplify certain aspects of the control electronics of the transducers (in particular, in the conditioning module 32), with respect to an echosounder whose antenna is consisted of a matrix of transducers.

Indeed, for a given extension of the antenna and for a given density of transducers at the surface of the antenna, the antenna 10' of the second embodiment comprises far more transducers than that of the first embodiment. By way of example, when the antenna 10 of the first embodiment comprises 6×2 transducers (6 transducers per arm), that of the second embodiment comprises 6×6 of them. And reducing the number of transducers makes it possible to simplify accordingly their control electronics, which we recall may comprise, for each transducer, an amplifier capable of delivering an output electrical voltage of about one hundred volts at least, varying over time in a rather complex manner. Making this control electronic more compact further allows accommodating it into a head of the echosounder 1, near the antenna 10, which therefore significantly simplifies the system of cables connecting the echosounder head to the rest of the driving and acquisition system.

Moreover, this parametric echosounder 1 with a Mills-cross antenna 10 makes it possible, during the above-described series of successive execution of step a), to take a "conventional" non-parametric three-dimensional sonar image of the underwater environment 3 (obtained without frequency mixing between acoustic waves), representative of the content of a volume of observation scanned by the second beam W2 during this series of executions of steps a).

Transmitting Antenna with a Matrix of Transducers

As shown in FIG. 15, in the second embodiment, the transducers 11, 12 of the transmitting antenna 10' are arranged in such a way as to form a matrix of several lines and several columns, the transducers 11, 12 being respectively located at the different intersections between the lines and columns of the matrix.

Herein, it is a rectangular matrix, whose columns are perpendicular to the lines. The transducers 11, 12 are hence located at the nodes of a rectangular network. The axis parallel to the lines of this matrix is denoted x, and the axis parallel to the columns is denoted y. The x-axis is parallel to the longitudinal axis of the vessel 2.

Along each line, and along each column of this matrix, the transducers 11, 12 are distributed over a length that is here longer than 20 centimetres, and even longer than 50 centimetres.

The way the transducers 11 of the first group 13' are arranged (driven at the first frequency f1), with respect to those 12 of the second group 14' (driven at the second frequency f2), is described hereinafter.

From the driving point of view, in this second embodiment, the driving and acquisition system 30' of the echosounder 1' is configured to, at step a):
  give the first delays $\Delta t_{1,1}$, $\Delta t_{1,2}$, $\Delta t_{1,3}$ ... such values that the first acoustic wave propagates as a first beam W1', which is collimated (FIG. 16), and to
  give the second delays $\Delta t_{2,1}$, $\Delta t_{2,2}$, $\Delta t_{2,3}$ ... such values that the second acoustic wave propagates as a second beam W2', which is also collimated.

These first and second beams W1', W2' are both centred on the same axis, which constitutes the superposition axis $z_s$.

To transmit the first acoustic wave as this first collimated beam, the driving and acquisition system 30' generates for example the first transmit signals in such a way that, for each transducer 11 of the first group 13', the first transmit signal $s_{1,1}$, $s_{1,2}$, $s_{1,3}$ ... that feeds this transducer 11 has, with respect to the reference signal s1, a first delay $\Delta t_{1,1}$, $\Delta t_{1,2}$, $\Delta t_{1,3}$ ... having a value proportional to the scalar product of a directing vector $uz_s$ by a vector r that indicates the position of the transducer 11 in question at the surface of the antenna 10'. The directing vector $uz_s$ is a vector, for example unitary, whose direction is that of the superposition axis $z_s$.

The second transmit signals are generated in the same way as the first transmit signals, but of course with a frequency equal to the second frequency f2.

In this second embodiment, the first and second beams W1', W2' almost entirely superpose each other (they almost coincide with each other). The common beam Wo', within which is generated the low-frequency wave, then corresponds directly to one, or equivalently to the other, of these two beams W1' and W2'. These different beams W1', W2' and Wo' are approximately conical. Each of the first and second beams W1' and W2' has a reduced angular opening, for example lower than 2 degrees both in a first plane that contains the superposition axis $z_s$ and the x-axis and in a second plane that contains the superposition axis $z_s$ and the y-axis (this angular opening is the angular width, at half the peak's maximum representing the acoustic intensity of the first and second acoustic wave, in a cross-section of the first or second beam).

In order to sound the content of this sub-bottom 40 below different points P1, P2, P3 of the bottom 4, the driving and acquisition system 30' here varies the first and second delays $\Delta t_{1,1}$, $\Delta t_{1,2}$, $\Delta t_{1,3}$, $\Delta t_{2,1}$, $\Delta t_{2,2}$, $\Delta t_{2,3}$ ..., from one execution of step a) to the next, in such a way as to modify jointly the orientation of the first beam W1' and that of the second beam W2', so that they remain superposed each other, but point to another point of the bottom 4.

Figure 17:
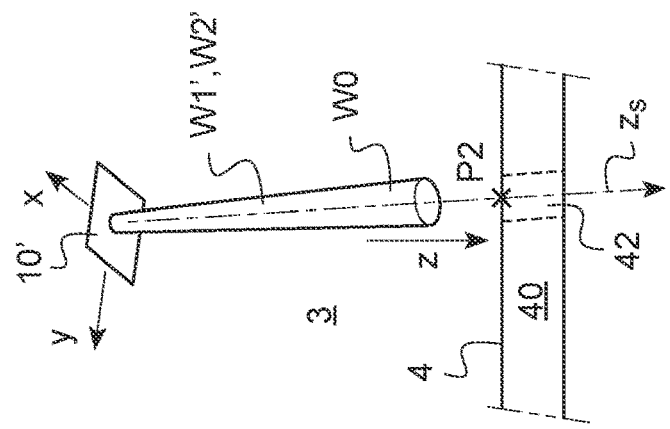
Figure 18:
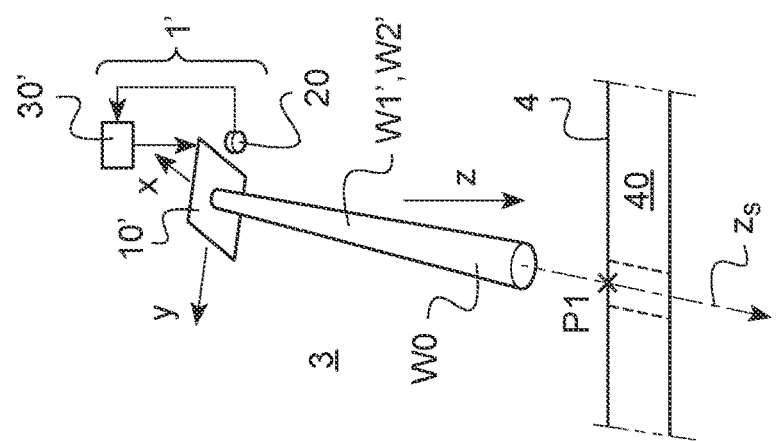

All FIGS. 16 to 18 schematically show the first and second beams W1 and W2 'formed by the first and second acoustic waves, for three successive executions of the transmission step a). The z-axis, represented in these figures as a reference and that is fixed, is perpendicular to the antenna 10'.

Like in the first embodiment, the driving and acquisition system 30' is configured to, at step a), drive the transducers 11,12 of the antenna 10' in such a way that the incidence angle, formed between the superposition axis $z_s$ and an axis perpendicular to the underwater environment bottom 4, is greater than the above-mentioned limit incidence angle. As explained hereinabove, this makes the detection of buried objects easier. For that purpose, the driving and acquisition system 30' adjusts the first and second delays $\Delta t_{1,1}$, $\Delta t_{1,2}$, $\Delta t_{1,3}$, $\Delta t_{2,1}$, $\Delta t_{2,2}$, $\Delta t_{2,3}$ ... in such a way that the superposition axis $z_s$ is inclined with respect to the axis perpendicular to the bottom.

In such a way that the first and second acoustic waves superpose each other as much as possible, and that as the beginning of their propagation, it is provided to mix the transducers 11 of the first group 13' with the transducers 12 of the second group 14', at the surface of the antenna 10', rather than to distribute them into two distinct areas (one of which would gather exclusively the transducers 11 of the first group, and the other would gather exclusively the transducers 12 of the second group).

On the antenna 10', the transducers 11 of the first group and those 12 of the second group are more precisely distributed in an alternating manner. Each transducer 11 of the first group 13' has for nearest neighbours transducers 12 of the second group 14'. Here, the transducers 11, 12 are thus distributed as a checkerboard, each white square of which is occupied by one of the transducers 11 of the first group, and each black square of which is occupied by one of the transducers 12 of the second group.

Other configurations can be contemplated, in which the transducers 11 of the first group would be, at the surface of the antenna 10', mixed with the transducers 12 of the second group. In this respect, the transducers could be distributed as a checkerboard, each white square of which would be occupied by two transducers of the first group (instead of only one), and each black square of which is occupied by two transducers of the second group (instead of only one). Therefore, it is more generally provided that the transducers 11 of the first group 13' occupy several distinct areas of the matrix formed by all the transducers, one or several of the transducers 12 of the second group 14' being interposed between any two of said areas.

High-Rate Acquisition

When the bottom 4 of the underwater environment 3 is located at a significant depth with respect to the echosounder 1; 1', the taking, point by point, of the image IM representative of the content of the sub-bottom 40 of this environment may be particularly long if particular provisions intended to accelerate it are not implemented.

Indeed, in the absence of such provisions, it is necessary to wait for a time higher than the round-trip time between the echosounder 1; 1' and the bottom 4 (round-trip at the speed of sound in water) between the sounding of the sub-bottom below a first point P1 of the bottom 4 and the sounding of the sub-bottom below a second point P2 of the bottom 4, to avoid a time superposition of the echo signals $s_E$ coming from these two points P1, P2, which would made them undistinguishable. To overcome this difficulty and to allow rapid acquisition of the image IM representative of the content of the sub-bottom 40 of the underwater environment 3, even when this environment is deep, the driving and acquisition system 30; 30' is here configured, both in the first and second embodiments, to vary the difference between said first frequency f1 and said second frequency f2, from one execution of step a) to the next.

Varying the difference between the first and second frequencies f1 and f2, from one execution of step a) to the next, makes it possible in a way to frequency encode the orientation of the superposition axis $z_s$ (that varies from one execution of step a) to the next). Indeed, the different points P1, P2, P3 of the bottom 4 sounded by the echosounder are then sounded by low-frequency waves having values $f_{LF1}$, $f_{LF2}$, $f_{LF3}$, ... $f_{LFn}$ different from each other. The individual echo signals, $s_E$, that come from these different points, can hence be distinguished from each other even if they superpose each other from a temporal point of view.

In other words, even if the set of the individual echo signals $s_E$, received after the different executions of the transmission step a), takes the shape of a same whole echo signal (acquired for example in a continuous manner by the receiver 20 and the acquisition module 33), in which the different individual echo signals temporally superpose each other (this whole echo signal is then equal, at each moment, to the superposition, i.e. the sum of the individual echo signals $s_E$), each of these individual echo signals $s_E$ may be extracted from the whole echo signal, herein by frequential filtering.

The different executions of the transmission step a) can then take place at short intervals from each other, and even simultaneously, whatever the depth of the underwater environment, without the risk of confusion between individual echoes coming from different points of the bottom. This considerably reduces the duration required to take the image IM representative of the content of the sub-bottom 40 of this environment.

Reducing that way the total duration of the series of transmissions intended to sound the bottom makes it possible to reduce the parasitic influence, on the image IM, of potential parasitic movements of the echosounder 1 or potential fluctuations of the properties of the underwater environment 3.

FIGS. 9 to 14 illustrate some features of the first and second acoustic waves transmitted that way during several successive executions of step a), during which the difference between the first frequency f1 and the second frequency f2 vary. These figures correspond to the case of the first embodiment of the echosounder 1 (Mills-cross antenna). This technique may be used similarly to other embodiments, in particular to the second embodiment described hereinabove.

Herein, during this series of transmissions, the first frequency f1 keeps a constant value $f1_0$, whereas the second frequency varies. During the successive executions of step a), the second frequency f2 takes successively different values $f2_1$, $f2_2$, $f2_3$, ... $f2_n$ (FIGS. 11 and 14), each associated to one of these executions (that is to say associated with execution n°1, execution n°2, etc..., respectively). These values are different from each other. They for example increase linearly over these successive executions of step a).

Figure 14:
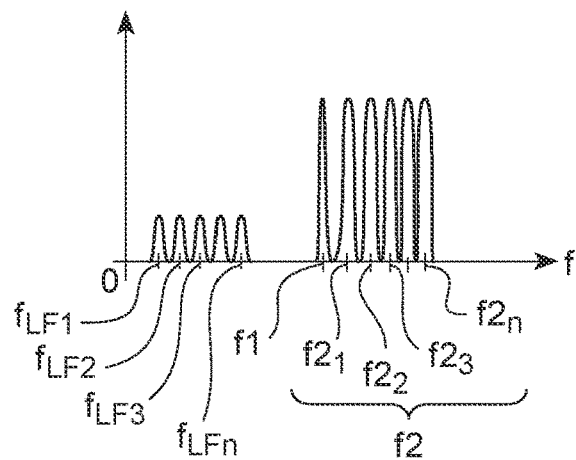
FIG. 14 shows the frequency spectra of the acoustic waves of FIGS. 9 to 13, FIG. 15 schematically shows a vessel provided with an echosounder according to a second embodiment, viewed from below, FIG. 16 schematically shows acoustic wave beams, transmitted at a fourth moment by the echosounder of FIG. 15, FIG. 17 schematically shows acoustic wave beams, transmitted at a fifth moment by the echosounder of FIG. 15, FIG. 18 schematically shows acoustic wave beams, transmitted at a sixth moment by the echosounder of FIG. 15, and FIG. 19 schematically shows the positions, with respect to the vessel of FIG. 1, of different points of the bottom sounded by the echosounder fitted on this vessel, viewed from the top.

From one execution of step a) to the next, the frequency $f_{LF}$ of the low-frequency acoustic wave generated in water thus also varies, and takes successively, during these different executions, values $f_{LF1}$, $f_{LF2}$, $f_{LF3}$, ... $f_{LFn}$ that are distinct from each other (FIG. 14). These different values $f_{LF1}$, $f_{LF2}$, $f_{LF3}$, ... $f_{LFn}$ may for example be separated two-by-two by 0.5 kilohertz, and be distributed between 15 and 25 kilohertz. This result could of course be also obtained by varying the first frequency f1 while maintaining the second frequency f2 fixed.

To extract the individual echo signals $s_E$, received in response to these different transmissions, the driving and acquisition system 30 performs a frequential filtering of the whole echo signal, which is here acquired in continuous by the receiver 20 during the method of characterizing the sub-bottom 40. This whole echo signal is filtered, by different bandpass filters, operating for example in parallel to each other, and centred respectively on the different frequency values $f_{LF1}$, $f_{LF2}$, $f_{LF3}$, ... $f_{LFn}$ (equal to the different values taken, during the successive executions of step a), by the difference between the first and the second frequency). The filtered signals delivered by these different filters then correspond to the different individual echo signals mentioned hereinabove, each of the individual echo signals making it possible for example to determine a one-dimensional image representative of the content of the sub-bottom 40 below the points P1, P2, P3 of the bottom aimed at during the corresponding execution of step a).

The spatial characteristics of the first and second acoustic waves transmitted during this series of executions of step a) will now be presented, with reference to FIGS. 9 to 13.

The first acoustic wave is here transmitted in continuous, seamlessly from one execution of step a) to the next. It thus forms a same whole acoustic wave, whose duration is longer than that of the second waves transmitted by the second arm 14 of the antenna 10 during the different executions of step a).

Figure 9:
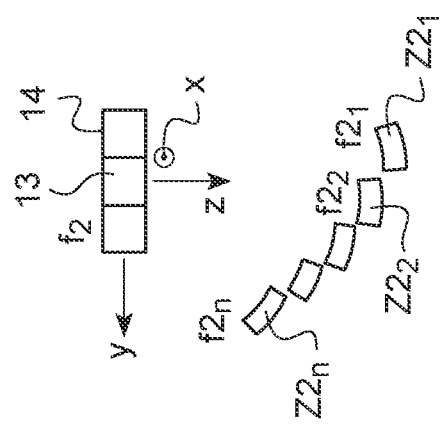

FIGS. 9 and 10 show the area Z1 of the underwater environment 3 occupied by this first wave, at a given moment, respectively in front view (that is to say in a plane perpendicular to the first arm 13 of the antenna 10) and side view (in a plane parallel to this first arm 13).

Figure 11:
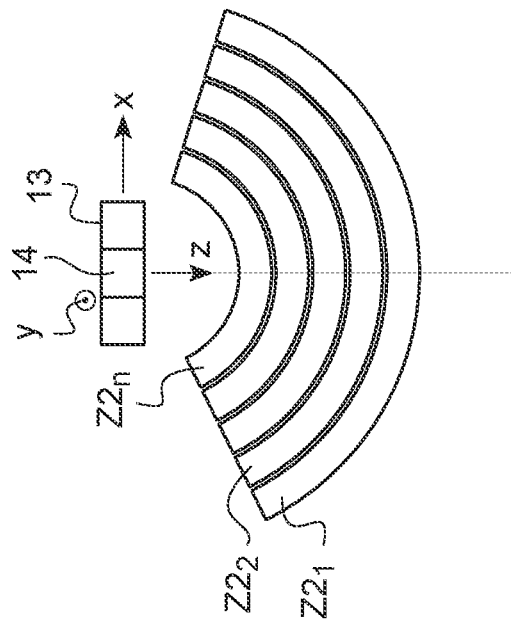

And FIG. 11 shows the areas $Z2_1$, $Z2_2$, ..., $Z2_n$ occupied, at the same moment as in FIG. 9, by the second acoustic waves transmitted during the different executions of step a)

mentioned hereinabove, in front view. These different areas are also represented in side view in FIG. 12.

Figure 13:
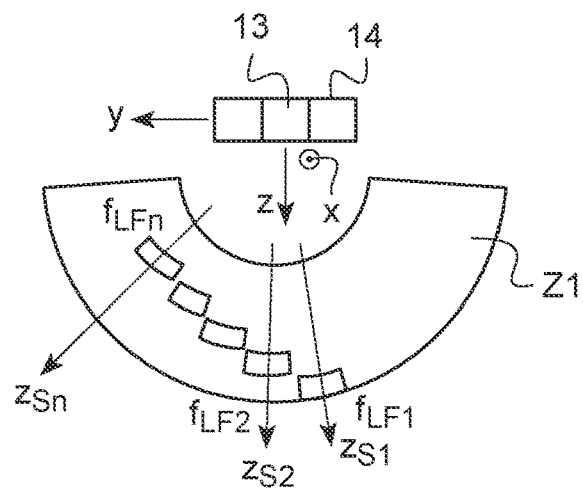

FIG. 13 corresponds to the superposition of FIGS. 9 and 11. It shows, at the same moment as for FIGS. 9 and 11, the areas Z1 and $Z2_1, Z2_2, \ldots, Z2_n$ respectively occupied by the first acoustic wave and by the second acoustic waves in question (front views). FIG. 13 thus shows, from a spatial point of view, the variation of frequency of the "low-frequency" acoustic wave generated by mixture, as a function of the orientation of the superposition axis (identified by the reference signs $z_{s1}, z_{s2}, \ldots, z_{sn}$ in this Figure). It is to be noted that FIGS. 9 to 13 are instantaneous views of the areas occupied by the acoustic waves in question, and that in this sense they are quite different from the views of FIGS. 5 to 7 that show, for the first and second acoustic waves, the whole area scanned by this wave during the propagation thereof (this scanned area corresponding to the beam W1 or W2).

Non-Parametric Sonar Image

The transmission of the first and second acoustic waves made at step a) makes it possible, in addition to the low-frequency sounding of the sub-bottom 40 of the underwater environment 3 that has been described hereinabove, to take a "conventional" sonar image representative of a part at least of the underwater environment 3. This additional image IM' is a conventional sonar image in this sense that it is obtained without mixing frequencies in water, unlike image IM.

In the embodiments described here, the driving and acquisition system 30; 30' takes advantage of this possibility. Indeed, it is here configured to (FIG. 8):

after each execution of step a), execute a step b') of acquiring an additional echo signal, of frequency equal to the first frequency f1 or to the second frequency f2, picked up by one at least of the transducers 11, 12 of the antenna in response to the transmission made a step a), and to c') determine the additional image IM' mentioned hereinabove, on the basis of said additional echo signals.

This provision makes it possible, by making a single series of transmission, that is to say by making a single series of executions of step a), to take both the "parametric" image IM and the additional image IM', and to thus combine the advantages:

of a low-frequency parametric sonar imaging allowing a good penetration into the sub-bottom 40, but for which the signal-to-noise ratio is generally lower than for a conventional sonar imaging (and that is hence less adapted than the latter to sound the rest of the underwater environment 3), and a conventional sonar imaging, for which the signal-to-noise ratio is generally high, and which is well adapted to sound the rest of the underwater environment 3, in particular to sound the depth thereof.

The driving and acquisition system 30; 30' is here configured to determine, on the basis of these additional echo signals, the depths, within the underwater environment 3, of the different points P1, P2, P3 of the bottom 4 below which the sub-bottom 40 is sounded by the low-frequency wave.

This allows combining a high-accuracy survey of the topography of a portion of the bottom 4 of the underwater environment 3, by conventional sonar imaging, and a survey of the content of the sub-bottom 40 located below this portion of the bottom 4, by parametric imaging.

Moreover, the driving and acquisition system 30; 30' may be configured to merge the data produced by processing of the parametric echo signals $s_E$ with the data produced by processing of the above-mentioned additional echo signals.

This merging may comprise for example an adjustment of the depths deduced from the parametric echo signals $s_E$, on the basis of the depths of the points P1, P2, P3 of the bottom deduced, with more accuracy, from the conventional, additional echo signals.

By way of example, in the case of the first embodiment, when the orientation of the superposition axis $z_s$ is modified by varying the orientation of the second transmission plane P12, whereas, at step b'), the echosounder 1 acquires several additional echo signals, of frequency equal to the second frequency f2 (apart from potential Doppler shifts). These additional echo signals are picked up by the different transducers 11 of the first arm 13 of the antenna, these transducers 11 being then used in reception. As known, all the additional echo signals acquired during this execution of step b') make it possible to determine a two-dimensional image representative of the content of the scan swath W2, scanned by the second acoustic wave transmitted at step a) during the propagation thereof. As steps a) and b') are repeated for several different orientations of the second transmission plane P12, the additional image IM' finally obtained is a three-dimensional sonar image, representative of the content of the underwater environment 3 in the volume of observation scanned by the second beam W2 during this set of executions of step a).

Finally, the driving and acquisition system 30; 30' may be configured to determine, based on the additional echo signals (conventional, "non-parametric", echo signals), a data representative of the constitution of the surface layer of the underwater environment sub-bottom 40, located below the points P1, P2, P3 of the bottom sounded by the echosounder. This surface layer of the sub-bottom is the upper part of the sub-bottom, which comes into contact with water. The data in question indicates in particular if the surface layer of this sub-bottom is consisted of sand, pebbles, fragmented rock or loose sediment, or if it is consisted instead of a one-piece bedrock or a solidified sedimentary layer as a whole. In particular, the driving and acquisition system 30; 30' may for example comprise a bottom classification module such as that comprised in the product Seapix developed by the applicant. Using a transverse scan swath, it is possible to measure a backscatter index of the bottom as a function of the grazing angle. These parameters are directly linked to the nature of the bottom. For more details, reference may be made to the document "*Seafloor classification with a Multi-swath Multi-beam Echo* Sounder" by Trung-Kien Nguyen, 2018. The method used in this case consists in observing a series of fixed areas on the bottom, insonified by the longitudinal scan swath. With the progression of the vessel in straight line, these areas are observed with a different view angle at each imaging phase of the sounder. By keeping in memory the brightness of each area as a function of the angle of observation, a backscatter profile of the bottom is kept for each of them, which is characteristic of the type of bottom observed (rock, type of sand, mud, seaweeds . . . ).

The driving and acquisition system 30; 30' may then be configured to determine a setpoint speed for the moving of the vessel 2 as a function of said data. This setpoint speed is lower when the data in question indicates that the surface layer of the sub-bottom 40 is liable to contain buried objects, that is to say when this data indicates that the surface layer of the bottom is consisted of sand, pebbles, fragmented rock or loose sediment, than when this data indicates that the surface layer of the sub-bottom 40 is not liable to contain buried objects, that is to say when it is consisted of a one-piece bedrock or a solidified sedimentary layer as a whole. This setpoint speed is then transmitted to a driving system of the vessel 2 that adjusts the seed of move of the vessel to this setpoint value. These provisions make it possible to reduce the time required to explore a given surface of the underwater environment bottom, by avoiding sounding in a detailed manner portions of the bottom that are not liable to contain buried objects.

Different variants may be applied to the echosounder and to the method of characterization of a portion of the underwater environment sub-bottom that have been described hereinabove.

First, instead of the transmission of the first acoustic wave by a first group of transducers, whereas the second acoustic wave is transmitted by a second group of transducers distinct from the first one, it may be provided that each transducer contributes to the transmission of these two waves. Within the framework of such a variant, the driving and acquisition system is configured in such a way that the transmit signals, which drive the transducers 11, 12, each comprise a first component and a second component respectively varying over time with the first frequency f1 and with the second frequency f2. The transducers 11, 12 of the antenna then transmit, at step a), a modulated acoustic wave, here modulated in amplitude, propagating along said superposition axis $z_s$, composed of the first acoustic wave and the second acoustic wave. In other words, this modulated acoustic wave is decomposed into the first acoustic wave and the second acoustic wave. The transmit signals are moreover also amplitude-modulated signals. From the point of view of the driving electronics of the transducers 11, 12, this variant is more difficult to implement than a transmission of the first and second acoustic waves by distinct transducers, because the transducers must then be supplied with high-voltage oscillating signals, of more complex form.

Moreover, an arrangement of the transducers on the antenna surface that is different from what has been described hereinabove could be used. In this respect, the transducers could be distributed in such a way as to form together a spiral instead of a cross or a matrix.

But in any case, the transducers of the antenna are not all distributed along a same line. As already indicated, their positions are two-dimensionally distributed, over a whole surface. More precisely, the whole comprising the different transducers of the transmitting antenna extends over a surface that has, along two orthogonal directions, two dimensions each longer than 20 centimetres, or even longer than 50 centimetres. This allows transmitting the first and second acoustic waves with a good directivity, which increases their power per surface unit and hence increases the efficiency of the non-linear process of generation of the low-frequency acoustic wave. This allows sounding the content of the underwater environment sub-bottom 40 with a good lateral resolution.

The invention claimed is:

1. A parametric echosounder comprising:
  a transmitting antenna comprising a plurality of transducers;
  at least one receiver; and
  a driving and acquisition system configured to execute the following steps:
    a) driving said transducers so that the transducers transmit, in an underwater environment, a first acoustic wave having a first frequency and a second acoustic wave having a second frequency, the first wave and the second wave superposing each other along a superposition axis directed towards a point of a bottom of the underwater environment, each of the transducers being driven by a transmit signal, transmit signals of the transducers having predetermined delays with respect to each other, and
    b) acquiring at least one echo signal, of frequency equal to a difference between said first frequency and said second frequency, picked up by said at least one receiver in response to the transmission made at step a),
  the driving and acquisition system being configured to execute all of steps a) and b) several times, by varying a part at least of said predetermined delays from one execution of the step a) to a next execution of step a), to modify an orientation of said superposition axis from one execution of step a) to the next execution of the step a), and
    c) determining, based on the at least one echo signal acquired during different executions of step b), a two-dimensional or three-dimensional image representative of a content of a sub-bottom of the underwater environment below each of said points of the bottom,
  the driving and acquisition system being further configured to, at step a):
    drive each of the transducers of a first group of said transducers by a first transmit signal varying over time at said first frequency, the transducers of the first group transmitting said first acoustic wave, the different first transmit signals having first delays, predetermined with respect to each other,
    drive each of the transducers of a second group of said transducers by a second transmit signal varying over time at said second frequency, the transducers of the second group transmitting said second acoustic wave, the different second transmit t signals having second delays, predetermined with respect to each other, and
    vary one or more of said first delays and said second delays from one execution of step a) to the next execution of step a), to modify the orientation of said superposition axis from one execution of step a) to the next execution of step a),
  said transducers being arranged to form a matrix of several lines and several columns, the transducers being respectively located at intersections between lines and columns of the matrix,
  the first and second delays being such that the first and second acoustic waves are transmitted as a first collimated beam and a second collimated beam, respectively, each centered to said superposition axis,
  the transducers of the first group occupying several distinct areas of said matrix, one or several of the transducers of the second group being interposed between any two of said distinct areas,
  each transducer of the first group having transducers of the second group as nearest neighbors.

2. The parametric echosounder according to claim 1, wherein specific ones of said transducers each comprise an element made of a piezoelectric material and a mechanical device applying a compressive stress to said piezoelectric material element, said compressive stress being higher than 7 bars.

3. The parametric echosounder according to claim 2, wherein:
  each of the transducers is configured to transmit acoustic waves in the underwater environment at frequencies higher than 50 kilohertz,
  the at least one receiver is configured to pick up and convert into electric form acoustic waves whose frequency is comprised between a reception bandwidth between 0 and 30 kilohertz, and the driving and acquisition system is configured such that the first and second frequencies are each higher than 50 kilohertz, and such that the difference between the first frequency and the second frequency is comprised in said reception bandwidth and lower than 30 kilohertz.

4. The parametric echosounder according to claim 2, wherein the driving and acquisition system is configured to vary the difference between said first frequency and said second frequency, from one execution of step a) to the next execution of step a).

5. The parametric echosounder according to claim 2, wherein the driving and acquisition system is further configured to:

after each execution of step a), acquire an additional echo signal, of frequency equal to said first frequency or to said second frequency, picked up by one at least of said transducers in response to the transmission made at step a), and determine an image representative of a portion of the underwater environment based on additional echo signals acquired during different executions of step a).

6. The parametric echosounder according to claim 1, wherein:

each of the transducers is configured to transmit acoustic waves in the underwater environment at frequencies higher than 50 kilohertz, the at least one receiver is configured to pick up and convert into electric form acoustic waves whose frequency is comprised between a reception bandwidth between 0 and 30 kilohertz, and the driving and acquisition system is configured such that the first and second frequencies are each higher than 50 kilohertz, and such that the difference between the first frequency and the second frequency is comprised in said reception bandwidth and lower than 30 kilohertz.

7. The parametric echosounder according to claim 6, wherein the driving and acquisition system is configured to vary the difference between said first frequency and said second frequency, from one execution of step a) to the next execution of step a).

8. The parametric echosounder according to claim 1, wherein the driving and acquisition system is configured to vary the difference between said first frequency and said second frequency, from one execution of step a) to the next execution of step a).

9. The parametric echosounder according to claim 1, wherein the driving and acquisition system is further configured to:

after each execution of step a), acquire an additional echo signal, of frequency equal to said first frequency or to said second frequency, picked up by one at least of said transducers in response to the transmission made at step a), and determine an image representative of a portion of the underwater environment based on additional echo signals acquired during different executions of step a).

10. The parametric echosounder according to claim 1, wherein the driving and acquisition is further configured to, at step a), drive said system transducers such that an incidence angle, formed between said superposition axis and an axis perpendicular to the bottom of the underwater environment, is greater than a limit incidence angle.

11. A method for characterizing a portion of a sub-bottom of an underwater environment, implemented by the parametric echosounder according to claim 1, the method comprising the following steps, executed by the driving and acquisition system:

a) driving said transducers of the parametric echosounder so that the transducers transmit, in an underwater environment, a first acoustic wave having a first frequency and a second acoustic wave having a second frequency, the first acoustic wave and the second acoustic wave superposing each other along a superposition axis directed towards a point of a bottom of the underwater environment, each of the transducers being driven by a transmit signal, the different transmit signals of the different transducers having predetermined delays with respect to each other;

b) acquiring an echo signal, of frequency equal to a difference between said first frequency and said second frequency, picked up by said at least one receiver in response to the transmission made at step a), all steps a) and b) being executed several times, by varying at least a part of said predetermined delays from one execution of step a) to the next execution of step a), to modify an orientation of said superposition axis from one execution of step a) to the next execution of step a); and c) determining, based on the echo signals acquired during different executions of step b), a two-dimensional or three-dimensional image representative of a content of the sub-bottom of the underwater environment below each of said points of the bottom.

12. A parametric echosounder comprising:

a transmitting antenna comprising a plurality of transducers, the transmitting antenna having a two-arm cross shape, specific ones of said transducers being arranged in a line one after another along a first arm of the transmitting antenna, all other transducers of the transmitting antenna being arranged in a line one after another along a second arm of the transmitting antenna;

at least one receiver; and a driving acquisition system configured to execute the following steps:

a) driving said transducers so that the transducers transmit, in an underwater environment, a first acoustic wave having a first frequency and a second acoustic wave having a second frequency, the first wave and the second wave superposing each other along a superposition axis directed towards a point of a bottom of the underwater environment, each transducer being driven by a transmit signal, different transmit signals of the transducers having predetermined delays with respect to each other, and b) acquiring at least one echo signal, of frequency equal to a difference between said first frequency and said second frequency, picked up by said at least one receiver in response to the transmission made at step a), the driving and acquisition system being configured to execute all of steps a) and b) several times, by varying a part at least of said predetermined delays from one execution of step a) to a next execution of step a), to modify an orientation of said superposition axis from one execution of step a) to the next execution of step a), and c) determining, based on the at least one echo signal acquired during different executions of step b), a two-dimensional or three-dimensional image representative of a content of sub-bottom of the underwater a environment below each of said points of the bottom, wherein the driving and acquisition system is configured to, at step a):

drive each of the transducers of a first group of said transducers by a first transmit signal varying over time at said first frequency, the transducers of the first group transmitting said first acoustic wave, the different first transmit signals having first delays, predetermined with respect to each other, drive each of the transducers of a second group of said transducers by a second transmit signal varying over time at said second frequency, the transducers of the second group transmitting said second acoustic wave, the second transmit signals having second delays, predetermined with respect to each other, and vary one or more of said first delays and said second delays from one execution of step a) to the next execution of step a), to modify the orientation of said superposition axis from one execution of step a) to the next execution of step a), wherein the transducers of the first group form the first arm of the transmitting antenna and the transducers of the second group form the second arm of the transmitting antenna, said first delays are such that the first acoustic wave propagates parallel to a first transmission plane, as a first beam having a narrow cross-section in a direction perpendicular to the first transmission plane and elongated parallel to the first transmission plane, said second delays being such that the second acoustic wave propagates parallel to a second transmission plane, as a second beam having a narrow cross-section along a direction perpendicular to the second transmission plane and elongated parallel to the second transmission plane, said superposition axis being located at an intersection between the first transmission plane and the second transmission plane, and wherein the driving and acquisition system is configured to, from one execution of step a) to the next execution of step a), one or more of:

vary said first delays in order to pivot the first transmission plane about a first scanning axis perpendicular to the first arm of the transmitting antenna, and vary said second delays in order to pivot the second transmission plane about a second scanning axis perpendicular to the second arm of the transmitting antenna.

13. The parametric echosounder according to claim 12, wherein specific ones of said transducers each comprise an element made of a piezoelectric material and a mechanical device applying a compressive stress to said piezoelectric material element, said compressive stress being higher than 7 bars.

14. The parametric echosounder according to claim 12, wherein:

each of the transducers is configured to transmit acoustic waves in the underwater environment at frequencies higher than 50 kilohertz, the at least one receiver is configured to pick up and convert into electric form acoustic waves whose frequency is comprised between a reception bandwidth between 0 and 30 kilohertz, and the driving and acquisition system is configured such that the first and second frequencies are each higher than 50 kilohertz, and such that the difference between the first frequency and the second frequency is comprised in said reception bandwidth and lower than 30 kilohertz.

15. The parametric echosounder according to claim 12, wherein the driving and acquisition system is configured to vary the difference between said first frequency and said second frequency, from one execution of step a) to the next execution of step a).

16. The parametric echosounder according to claim 12, wherein the driving and acquisition system is further configured to:

after each execution of step a), acquire an additional echo signal, of frequency equal to said first frequency or to said second frequency, picked up by one at least of said transducers in response to the transmission made at step a), and determine an image representative of a portion of the underwater environment based on additional echo signals acquired during different executions of step a).

17. The parametric echosounder according to claim 12, wherein the driving and acquisition system is further configured to, at step a), drive said transducers such that an incidence angle, formed between said superposition axis and an axis perpendicular to the bottom of the underwater environment, is greater than a limit incidence angle.

18. The parametric echosounder according to claim 12, wherein the driving and acquisition system is further configured such that:

said transmit signals each comprise a first component and a second component varying over time with said first frequency and with said second frequency, respectively, and the transducers of the antenna transmit, at step a), a modulated acoustic wave propagating along said superposition axis, composed of said first acoustic wave and said second acoustic wave.

* * * * *